United States Patent
Yamada et al.

(10) Patent No.: US 11,810,462 B2
(45) Date of Patent: Nov. 7, 2023

(54) AERIAL VEHICLE OPERATION MANAGEMENT DEVICE AND AERIAL VEHICLE OPERATION MANAGEMENT METHOD

(71) Applicant: NTT DOCOMO, INC., Tokyo (JP)

(72) Inventors: Takefumi Yamada, Tokyo (JP); Youhei Oono, Tokyo (JP); Yuichiro Segawa, Tokyo (JP); Shinya Hanano, Tokyo (JP); Takashi Yoshimoto, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 386 days.

(21) Appl. No.: 17/269,324

(22) PCT Filed: May 21, 2019

(86) PCT No.: PCT/JP2019/020126
§ 371 (c)(1),
(2) Date: Feb. 18, 2021

(87) PCT Pub. No.: WO2020/039674
PCT Pub. Date: Feb. 27, 2020

(65) Prior Publication Data
US 2021/0312820 A1    Oct. 7, 2021

(30) Foreign Application Priority Data
Aug. 24, 2018 (JP) .................................. 2018-157220

(51) Int. Cl.
*G08G 5/00* (2006.01)
*H04L 5/14* (2006.01)
(Continued)

(52) U.S. Cl.
CPC ......... *G08G 5/0043* (2013.01); *G08G 5/0004* (2013.01); *H04L 5/14* (2013.01); *H04W 56/0055* (2013.01)

(58) Field of Classification Search
None
See application file for complete search history.

(56) References Cited

U.S. PATENT DOCUMENTS

2018/0139752 A1* 5/2018 Wang .................. H04L 27/2607
2018/0253978 A1   9/2018 Tabuchi
(Continued)

FOREIGN PATENT DOCUMENTS

| JP | H11340934 A | 12/1999 |
| WO | 2017115807 A | 7/2017 |

(Continued)

OTHER PUBLICATIONS

Notice of Reasons for Refusal issued in corresponding Japanese Patent Application No. 2020-538177, dated Nov. 16, 2021.
(Continued)

*Primary Examiner* — Aniss Chad
*Assistant Examiner* — Madison R Hughes
(74) *Attorney, Agent, or Firm* — DILWORTH IP, LLC

(57) ABSTRACT

A specifying unit 51 of a flying body operation management device 50 specifies an airspace in which a propagation delay equal to or greater than a threshold value occurs in the uplink of a time-division duplex between a wireless communication terminal 30 and a wireless base station 41 to which wireless communication terminal 30 is wirelessly connected. Next, an assigning unit 52 of flying body operation management device 50 performs a process of assigning, with respect to each airspace, a flying body 10 having a wireless communication terminal 20. At this time, with respect to an airspace specified by specifying unit 51, assigning unit 52 limits the assigning of flying body 10 on which wireless communication terminal 20 is mounted.

7 Claims, 4 Drawing Sheets

(51) Int. Cl.
*H04W 56/00* (2009.01)
*B64U 101/20* (2023.01)

(56) References Cited

U.S. PATENT DOCUMENTS

| | | | | |
|---|---|---|---|---|
| 2018/0279325 A1* | 9/2018 | Huang | ............ | H04W 72/54 |
| 2018/0293897 A1* | 10/2018 | Murphy | ............ | H04W 24/02 |
| 2019/0077508 A1 | 3/2019 | Shimezawa et al. | | |
| 2022/0353650 A1* | 11/2022 | Aldana | ............ | H04W 36/08 |

FOREIGN PATENT DOCUMENTS

| | | | | |
|---|---|---|---|---|
| WO | 2018042927 A | 3/2018 | | |
| WO | WO-2019095738 A1 * | 5/2019 | ............ | H04B 17/345 |

OTHER PUBLICATIONS

3GPP TS 36.300 v11.14.0 (Dec. 2015) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); 210 pp.

International Search Report issued in corresponding PCT Application No. PCT/JP2019/020126 dated Aug. 27, 2019.

* cited by examiner

AERIAL VEHICLE OPERATION MANAGEMENT DEVICE AND AERIAL VEHICLE OPERATION MANAGEMENT METHOD

TECHNICAL FIELD

The present invention pertains to a technique for assigning flight airspaces to a flying body.

BACKGROUND

Long term evolution (LTE) is developed into specifications for the purpose of further increasing the data rate and/or reducing delays in universal mobile telecommunications system (UMTS) networks (3GPP TS 36.300 "Evolved UTRA and Evolved UTRAN Overall description"). In LTE, as multi-access systems, a system using orthogonal frequency division multiple access (OFDMA) as a base is used in the downlink, and a system using single carrier frequency division multiple access (SC-FDMA) as a base is used in the uplink. Moreover, for the purpose of further-widening the broadband and increasing the speed from LTE, LTE successor systems (sometimes referred to as LTE advanced or enhanced LTE, for example (hereafter referred to as "LTE-A")) have been examined and developed into specifications (Rel. 10/11).

Duplex modes of wireless communications in LTE and LTE-advanced systems include frequency division duplex (FDD) in which an uplink (UL) and a downlink (DL) are subject to frequency division, and time division duplex in which an uplink and a downlink are subject to time division. In TDD, the same frequency region is applied to the communication of the uplink and downlink, the uplink and downlink are subject to time division, and wireless signal waves are transmitted/received.

The TDD of an LTE system, as exemplified in FIG. 1, has a frame configuration including an uplink subframe (UL SF) and a downlink subframe (FL SF). Moreover, when switching from DL to UL, a special subframe (SP SF) is set. A special subframe comprises a DL link extension period (DL extension), a guard period (GP), and an uplink extension period (UL extension).

Similar to wireless communication terminals mounted on unmanned flying bodies i.e. drones, wireless communication terminals that perform communication in skies with clear visibility in all directions exist. In such a case, a wireless communication terminal that is present farther than estimated from a wireless base station sometimes becomes wirelessly connected with the wireless base station. This causes a long delay for UL data transmitted from the wireless communication terminal to be propagated to the wirelessly connected wireless base station.

FIG. 2 explains the cause of a negative effect occurring to another wireless communication terminal when a long delay occurs in the uplink of a time-division duplex between a wireless communication terminal and a wireless base station. FIG. 2 exemplifies a situation in which a wireless communication terminal DR1 mounted on a given flying body is wirelessly connected to a wireless base station BS1, a wireless communication terminal DR2 mounted on a different flying body is wirelessly connected to a wireless base station BS2, and a wireless communication terminal MT1 held by a user on the ground is wirelessly connected to wireless base station BS2. At this time, a distance L0 between wireless communication terminal DR1 and wireless base station BS1 is greater than a distance L2 between wireless communication terminal DR1 and wireless communication terminal MT1, which is greater than distance L1 between wireless communication terminal DR1 and wireless communication terminal DR2.

The transmission timing of UL data from a wireless communication terminal to a wireless base station is adjusted by use of a time alignment function. For example, wireless communication terminal DR1 begins transmission of UL data before the timing of a UL period assigned to wireless base station BS1, by the amount of propagation delay. Transmission of the UL data overlapping, in terms of time, with the DL period of another wireless communication terminal, causes problems to occur such as interference; thus, a guard period (GP) is provided between a DL extension period and a UL extension period. A suitable value is set for the length of the GP for each wireless base station. In FIG. 2, the length of the period of the GP of wireless base station BS1 is greater than the length of the period of the GP of wireless base station BS2. Here, it is assumed that the timings of the start and end of each subframe are synchronized between wireless base stations. That is, the timings of the start and end of the uplink subframe and downlink subframe in wireless base stations BS1 and BS2 are the same.

As described above, since a wireless communication terminal that is mounted on a flying body can exist farther than estimated from a wireless base station that is wirelessly connected, the propagation delay from wireless communication terminal DR1 to wireless base station BS1 in the example in FIG. 2 is sometimes longer than the length of the period of the GP set in wireless base station BS1. As a result, UL data transmitted from wireless communication terminal DR1 can be received by wireless communication terminal DR2 or wireless communication terminal MT1, and further, if the reception strength at this time is equal to or greater than a threshold value, negative effects such as interference can occur. In the example in FIG. 2, for example, no particular problems occur because the timing at which UL data transmitted from wireless communication terminal DR1 reaches wireless communication terminal MT1 belongs to the GP. Meanwhile, since the timing at which UL data transmitted from wireless communication terminal DR1 reaches wireless communication terminal DR2 belongs to the DL period, if the reception strength thereof is equal to or greater than a threshold value, problems such as interference occur with respect to wireless communication terminal DR2.

The present invention was achieved in view of such situations, and the purpose thereof is to suppress negative effects with respect to other wireless communication terminals if a long delay occurs in the uplink of a time-division duplex between a wireless communication terminal and a wireless base station.

SUMMARY OF THE INVENTION

The present invention provides an aerial vehicle operation management device comprising: an identifying unit configured to identify an airspace in which a propagation delay equal to or greater than a threshold value occurs in an uplink of a time-division duplex between a wireless communication terminal and a wireless base station to which the wireless communication terminal is wirelessly connected; and an assigning unit configured to assign an aerial vehicle to each of airspaces, wherein the assigning unit is configured to impose a restriction on assignment of an aerial vehicle, on which a wireless communication terminal is mounted, to an airspace identified by the identifying unit.

The identifying unit may be configured to identify an airspace that satisfies: a condition that a first wireless communication terminal is present within the airspace, and a second wireless communication terminal connected to a second wireless base station, which is different from the first wireless base station to which the first wireless communication terminal is connected, is present within a range of a given distance from the first wireless communication terminal; or a condition that the second wireless communication terminal is performing a time-division duplex with the second wireless base station by use of a guard period that is shorter than a guard period used between the first wireless communication terminal and the first wireless base station.

The given distance may be a distance at which the second wireless communication terminal is capable of receiving a wireless signal wave transmitted from the first wireless communication terminal at a reception strength that is equal to or greater than a threshold value.

The assigning unit may be configured not to assign the aerial vehicle on which the wireless communication terminal is mounted, to an airspace identified by the identifying unit.

The assigning unit may be configured to assign a reduced number of flying bodies, on which a wireless communication terminal is mounted, to an airspace identified by the identifying unit, compared to airspaces other than the identified airspace.

The assigning unit may be configured to limit a number of flying bodies, on which a wireless communication terminal is mounted, assigned to an airspace identified by the identifying unit, to a number equal to or smaller than a threshold value that varies depending on an airspace.

The present invention provides an aerial vehicle operation management method comprising: identifying an airspace in which a propagation delay equal to or greater than a threshold value occurs in an uplink of a time-division duplex between a wireless communication terminal and a wireless base station to which the wireless communication terminal is wirelessly connected; and assigning an aerial vehicle to each of airspaces, wherein a restriction is imposed on assignment of an aerial vehicle, on which a wireless communication terminal is mounted, to the identified airspace.

The present invention enables suppression of negative effects on other wireless communication terminals if a long delay has occurred in the uplink of a time-division duplex between a wireless communication terminal and a wireless base station.

DETAILED DESCRIPTION

Configuration

Figure 3:
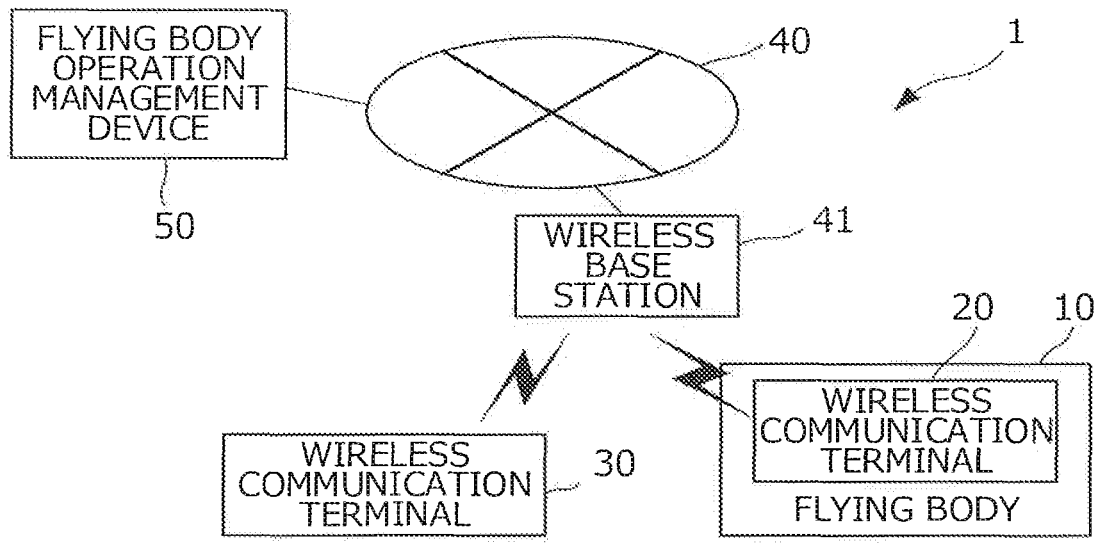
FIG. 3 is a block diagram illustrating one example of the configuration of a flight control system in accordance with the present invention.

FIG. 3 is a drawing illustrating one example of the configuration of a flight control system 1 pertaining to the present embodiment. Flight control system 1 comprises a flying body 10 such as a drone, a wireless communication terminal 20 mounted on flying body 10, a wireless communication terminal 30 to be used by a user on the ground, a network 40 including a wireless base station 41, and a flying body operation management device 50 that is connected to network 40.

In addition to a central processing unit (CPU), a read-only memory (ROM), a random access memory (RAM), and an auxiliary storage device, flying body 10 physically comprises: a computer comprising a positioning unit that measures the position of flying body 10, a communication interface that is connected to wireless communication terminal 20, and the like; and a drive mechanism including various sensors, motors, rotary blades, and the like, which are controlled by the computer. Flying body 10 flies through the air by means of a computer controlling the drive mechanism in accordance with a flight plan or the like including the position in an airspace assigned to flying body 10, the time at which flying body 10 flies past the position, and the like.

In addition to a CPU, a ROM, a RAM, and an auxiliary storage device, wireless communication terminals 20 and 30 physically comprise communication interfaces for communicating via network 40, communication interfaces that are connected to the computer of flying body 10, and the like. A wireless communication system is made up of wireless communication terminals 20 and 30, and network 40, which includes wireless base station 41. This wireless communication system is, for example, a wireless communication system according to long term evolution (LTE). In LTE, wireless communication terminals 20 and 30 are referred to as UEs, and wireless base station 41 is referred to as an eNB. An area capable of wirelessly communicating with each wireless base station 41 is referred to as a cell. Wireless communication terminals 20 and 30, which are within each cell, are wirelessly connected to wireless base station 41 that form the cell and perform wireless communication. For example, wireless communication terminal 30 used by a user on the ground performs, wireless communication with wireless base station 41, on the ground. Meanwhile, wireless communication terminal 20 that is mounted on flying body 10 performs wireless communication with wireless base station 41 not only on the ground but also in the air (for example, an airspace that is 30 m or higher in altitude).

Flying body operation management device 50 is an information-processing device that manages the flight of flying body 10. The present embodiment is particularly characterized by a process in which flying body operation management device 50 assigns, to flying body 10, an airspace in which flying body 10 flies. Here, assigning an airspace to flying body 10 signifies flying body operation management device 50 associating identification information of flying body 10 with identification information of an airspace in which flying body 10 flies and storing the associated information as the flight plan of flying body 10.

Figure 4:
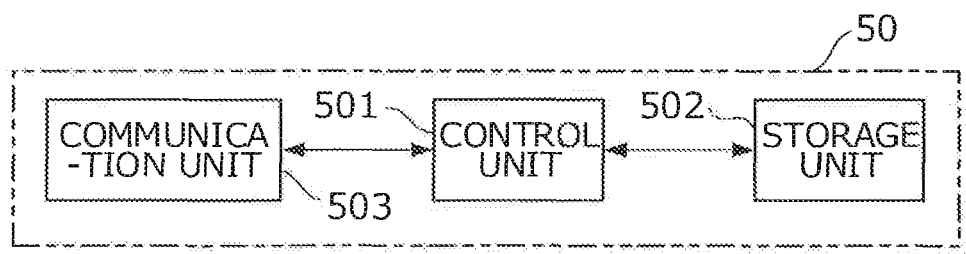
FIG. 4 is a block diagram illustrating the hardware configuration of a flying body operation management device in accordance with the present invention.

FIG. 4 is a drawing illustrating the hardware configuration of flying body operation management device 50. Flying body operation management device 50 is a computer device having a control unit 501 comprising a CPU, a ROM, and a RAM, a storage unit 502, and a communication unit 503. A CPU is a processor that performs various calculations. A ROM is a non-volatile memory that stores programs and data used to start up flying body operation management device 50, for example. A RAM is a volatile memory that functions as a work area when the CPU executes programs. Storage unit 502 is a non-volatile auxiliary storage device such as an HDD or an SSD, and stores programs and data used in flying body operation management device 50. The function illustrated in FIG. 5 below is realized by means of the CPU executing the program. Communication unit 503 is an interface for performing communication via network 40 in accordance with predetermined communication standards.

Figure 5:
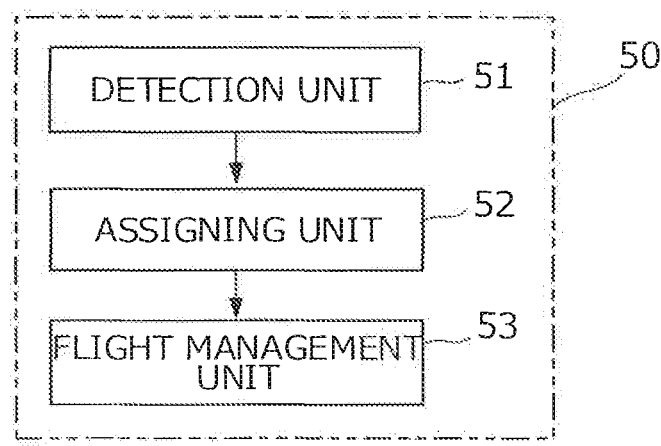
FIG. 5 is a block diagram illustrating the functional configuration of a flying body operation management device in accordance with the present invention.

FIG. 5 is a drawing illustrating one example of the functional configuration of flying body operation management device 50. Each of the functions in flying body operation management device 50 is realized by the CPU executing predetermined software (program) and performing various calculations, and controlling communication by communication unit 503 and reading and/or writing of data in the ROM, RAM, and storage unit 502.

Figure 1:
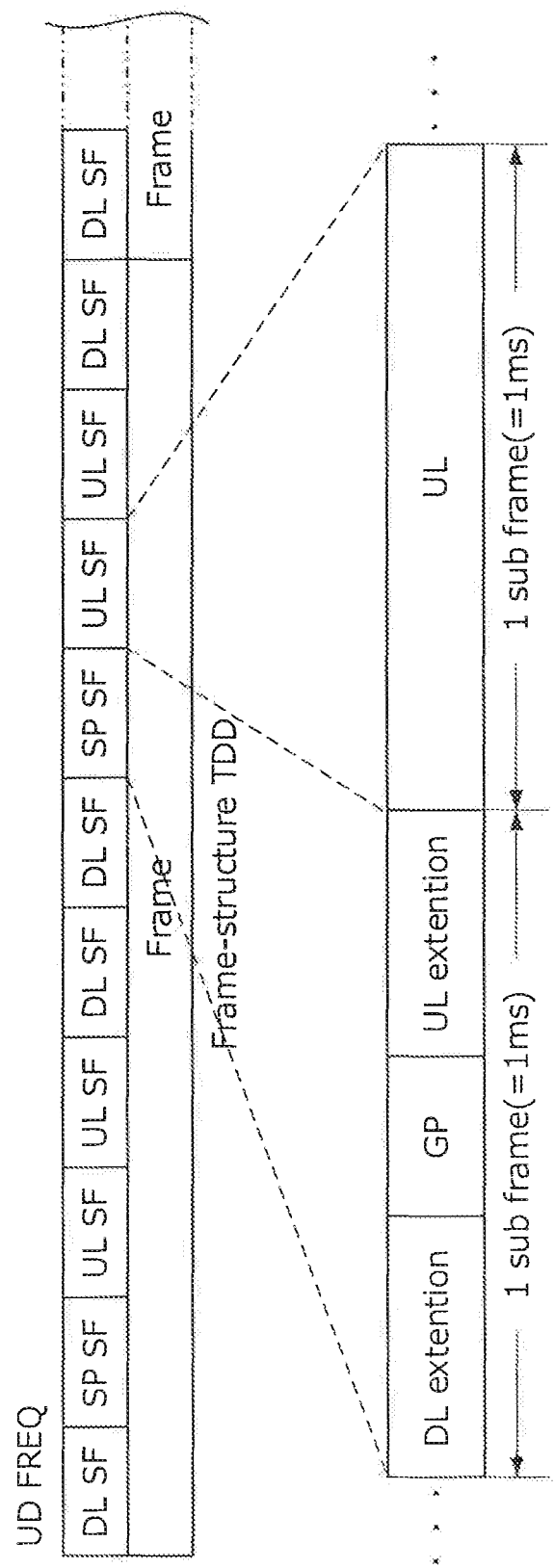
FIG. 1 is a drawing exemplifying the frame configuration in the TDD of an LTE system.
Figure 2:
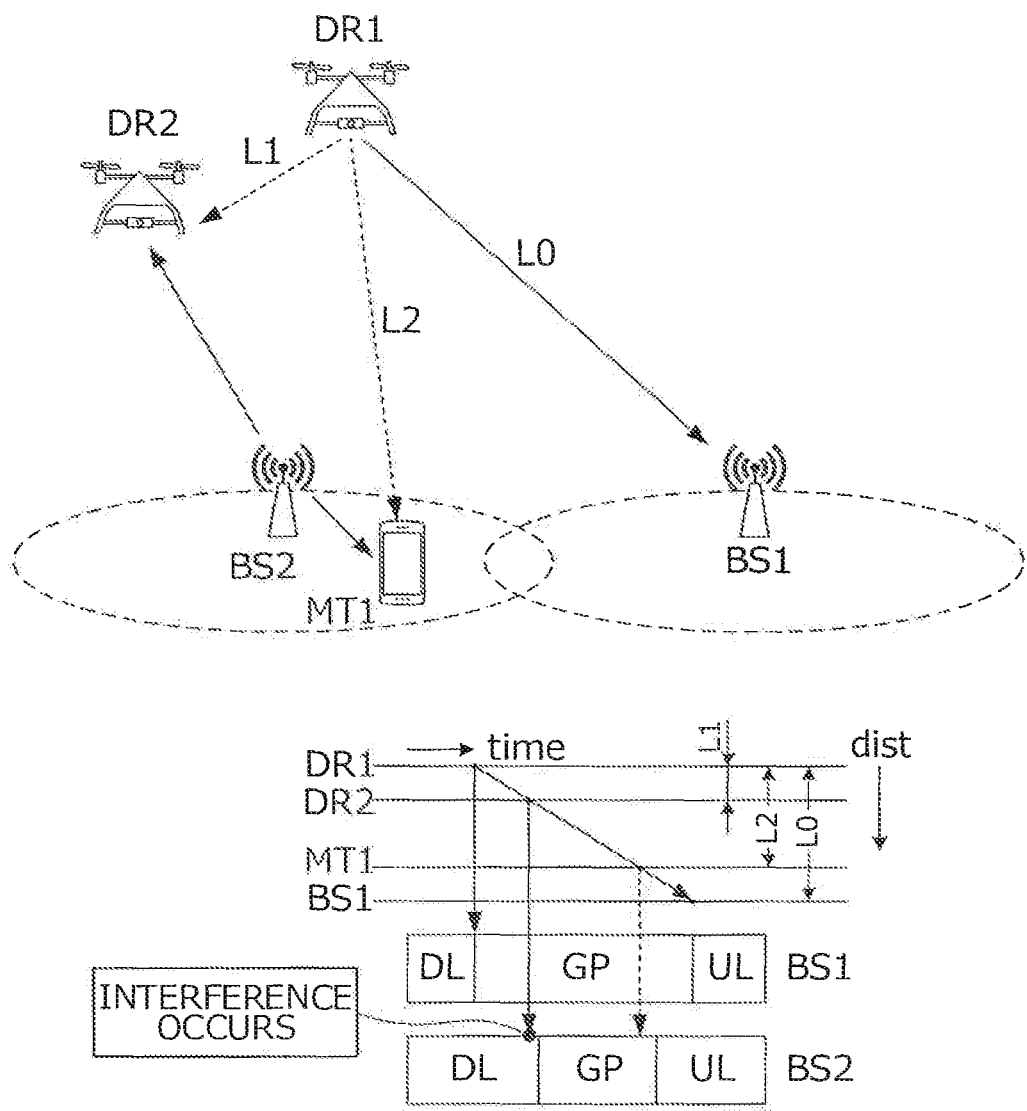
FIG. 2 is a drawing explaining the cause of a negative effect occurring to another wireless communication terminal when a long delay has occurred in the uplink of a time-division duplex between a wireless communication terminal and a wireless base station.

In FIG. 5, specifying unit 51 specifies the airspace in which a propagation delay equal to or greater than a threshold value occurs, in the uplink of a time-division duplex between wireless communication terminal 30 and wireless base station 41 to which wireless communication terminal 30 is wirelessly connected. More specifically, since it is possible to specify the amount of propagation delay between each wireless base station 41 and wireless communication terminal 30 that is wirelessly connected thereto, specifying unit 51 collects information pertaining to the amount of propagation delay from each wireless base station 41, and specifies the airspace within a range from wireless base station 41, for which a propagation delay equal to or greater than a threshold value occurred, to a distance corresponding to the amount of propagation delay thereof (propagation speed of wireless signal wave×amount of propagation delay). Moreover, another method exists, wherein the airspace in which a propagation delay equal to or greater than a threshold value occurs is specified by performing a simulation on the basis of the position and size of a cell in each wireless base station 41, map information, and a specific radio wave propagation model. The threshold value used here is the length of the period of the GP in wireless base station 41 to which abovementioned wireless communication terminal 30 is wirelessly connected, for example. In such an airspace, as exemplified in FIG. 2, the propagation delay of UL data transmitted from wireless communication terminal 20 mounted on flying body 10 becoming sufficiently long so as to cause transmission of UL data to begin from a point in time that is much later, resulting in a possibility of the UL data thereof being received by other wireless communication terminals 20 and 30.

Moreover, it is desirable for specifying unit 51 to specify an airspace in which a substantial problem such as interference may occur, from among airspaces in which a propagation delay equal to or greater than a threshold value occur. Specifically, specifying unit 51 specifies an airspace that satisfies a first condition and second condition such as the following. The first condition is that, if a first wireless communication terminal is present within the airspace, a second communication terminal wirelessly connected to the second wireless base station is present in the range of a given distance from the first wireless communication terminal, the second wireless base station being different from the first wireless base station to which the first wireless communication terminal is wirelessly connected. In the example in FIG. 2, wireless communication terminal DR2 (second communication terminal) wirelessly connected to wireless base station BS2 (second wireless base station) is present in a range of a given distance from wireless communication terminal DR1 (first wireless communication terminal), wireless base station BS2 (second wireless base station) being different from wireless base station BS1 (first wireless base station) to which wireless communication terminal DR1 (first wireless communication terminal) is wirelessly connected. Here, a "given distance" is substantially a distance at which it is possible to receive, at a reception strength equal to or greater than a threshold value, wireless signal waves transmitted from wireless communication terminal DR1 (first wireless communication terminal). Since it is possible to specify the positions of each of wireless communication terminals 20 and 30 using a global positioning system (GPS) or so-called wireless base station positioning, the satisfaction of the first condition is determined according to whether or not wireless communication terminals 20 and 30 are present within the range of a distance equal to or shorter than a given threshold value from an airspace in which a propagation delay equal to or greater than a threshold value occurs. As such, if the second wireless communication terminal sufficiently close to the first wireless communication terminal mounted on flying body 10 is present, it is possible that UL data transmitted from the first wireless communication terminal is inevitably received by the second wireless communication terminal at a sufficient reception strength.

The second condition is that the second wireless communication terminal performs a time-division duplex with the second wireless base station at a GP that is shorter than the length of the period of the GP between the first wireless communication terminal and the first wireless base station. In the example in FIG. 2, wireless communication terminal DR2 (second wireless communication terminal) performs a time-division duplex with wireless base station BS2 (second wireless base station) at a GP that is shorter than the length of the period of the GP between first wireless communication terminal DR1 (first wireless communication terminal) and first wireless base station BS1 (first wireless base station). In each wireless base station 41, since it is possible to specify the length of the period of the GP between wireless communication terminal 30 wirelessly connected thereto, specifying unit 51 collects information pertaining to the length of the period of the GP from each wireless base station 41 and determines the satisfaction of the second condition. When such relationships with the length of period of GPs exist, it is possible that UL data transmitted from the first wireless communication terminal mounted on flying body 10 is inevitably received in the DL period of the second wireless communication terminal.

In the present embodiment, specifying unit 51 specifies an airspace that satisfies the first condition and second condition, but may specify an airspace that satisfies only the first condition or second condition.

Assigning unit 52 performs a process of assigning flying body 10 having wireless communication terminal 20, with respect to each airspace. At this time, with respect to an airspace specified by specifying unit 51, assigning unit 52 limits the assigning of flying body 10 on which wireless communication terminal 20 is mounted. This limiting includes not assigning, with respect to an airspace specified by specifying unit 51, flying body 10 on which wireless communication terminal 20 is mounted, or limiting, with respect to an airspace specified by specifying unit 51, the number of flying body 10, on which wireless communication terminal 20 is mounted, assigned compared to airspaces other than an airspace specified by specifying unit 51. That is, if flying body 10 on which wireless communication terminal 20 is mounted flies through an airspace specified by specifying unit 51, a problem such as that illustrated in FIG. 2 may occur. Accordingly, in such an airspace, assigning unit 52 ensures such a problem does not occur by limiting the assigning of flying body 10 on which a problem-causing wireless communication terminal 20 is mounted.

In addition to storing flight plans, flight management unit 53 records identification information and flight status thereof for flying body 10, which is under the control of flying body operation management device 50. Flight status includes the position in which flying body 10 is flying, and the date and time of the position. Wireless communication terminal 20 of flying body 10 notifies flying body operation management device 50 of the position, the date, and the time via network 40. Flight management unit 53 determines whether or not the position, date, time are within the flight plan, and based on the results of the determination, issues flight commands to flying body 10 via network 40 and wireless communication terminal 20, as necessary.

Figures 6, 7:
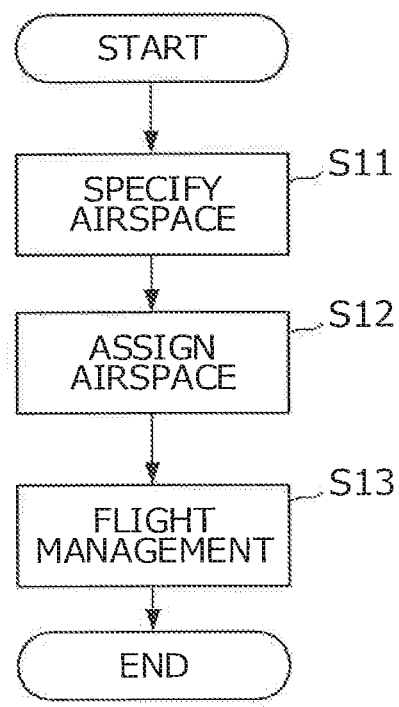
FIG. 6 is a drawing illustrating one example of data stored in the flying body operation management device in accordance with the present invention.
FIG. 7 is a flow chart illustrating the processing steps of the flying body operation management device in accordance with the present invention.

Next, the operation of the present embodiment is explained. In FIG. 7, specifying unit 51 of flying body operation management device 50 specifies the airspace in which a propagation delay equal to or greater than a threshold value occurs in the uplink of a time-division duplex between wireless communication terminal 30 and wireless base station 41 to which wireless communication terminal 30 is wirelessly connected. Moreover, specifying unit 51 specifies an airspace that satisfies the aforementioned first condition and second condition from among airspaces in which a propagation delay equal to or greater than a threshold value occurs (step S11). As exemplified in FIG. 6, for example, specifying unit 51 writes a flag (specified airspace flag) by associating the flag with a specified airspace (hereafter referred to as specified airspace) from among airspace IDs which represent identification information for each airspace in which flying body 10 may be flying. In the example in FIG. 6, specified airspace flag "1" signifies a specified airspace, and specified airspace flag "0" signifies an airspace that is not a specified airspace. The contents in FIG. 6 are stored in flight management unit 53 as part of the flight plan.

Next, assigning unit 52 of flying body operation management device 50 performs a process of assigning, with respect to each airspace, flying body 10 having wireless communication terminal 20 (step S12). At this time, with respect to an airspace specified by specifying unit 51, assigning unit 52 limits the assigning of flying body 10 on which wireless communication terminal 20 is mounted. That is, assigning unit 52 assigns, with respect to airspaces other than the specified airspace, flying body 10 having wireless communication terminal 20, without assigning, with respect to the specified airspace, flying body 10 having wireless communication terminal 20. Assigning unit 52 of flying body operation management device 50 limits the number of flying bodies 10 assigned with respect to a specified airspace to be fewer than the number of flying bodies assigned with respect to airspaces other than the specified airspace. For example, assigning unit 52 sets the upper limit of the number of flying bodies 10 assigned with respect to each unit volume in a specified airspace as U1, and the upper limit of the number of flying bodies assigned with respect to each unit volume in airspaces other than the specified airspace as U2 (U1<U2). The minimum value of U1 is zero. Assigning unit 52 assigns flying body 10 with respect to an airspace by associating, within the upper-limit range, identification information of flying body 10 with identification information of the airspace through which flying body 10 flies, and writing the associated information in flight management unit 53 as a flight plan.

Flight management unit 53 performs flight management (step S13). Specifically, flight management unit 53 creates a flight plan including flight route, flight period, and the like, and stores the flight plan on the basis of the assigning conditions in such an airspace. Furthermore, flight management unit 53 records identification information and flight status thereof for flying body 10, which is under the control of flying body operation management device 50. The flight status includes the position in which flying body 10 is flying, and the date and time of the position. Wireless communication terminal 20 of flying body 10 notifies flying body operation management device 50 of the position, date, and time via network 40. Flight management unit 53 determines whether or not the position, date, and time are within the flight plan, and based on the results of the determination, issues flight commands to flying body 10 via network 40 and wireless communication terminal 20, as necessary.

According to the present embodiment explained above, negative effects on other wireless communication terminals are suppressed if a long delay occurs in the uplink of a time-division duplex between a wireless communication terminal and a wireless base station.

Modified Examples

The present invention is not limited to the above-described embodiment. The above-described embodiment may be modified as follows. Moreover, two or more of the following modified examples may be combined.

Assigning unit 52 limits the number of flying bodies 10, on which wireless communication terminal 20 is mounted, assigned to a number equal to or smaller than a threshold value with respect to the airspaces specified by specifying unit 51, but may use a varying threshold value according to the airspace as the threshold value. For example, a first threshold value is used in an airspace of flying body 10 corresponding to an overpopulated area, and a second threshold value is used in an airspace of flying body 10 corresponding to a non-overpopulated area (first threshold value>second threshold value).

Assigning unit 52 may perform assigning corresponding to a communication function (specifically, the presence/absence of a time-division duplex function) provided to flying body 10. For example, assigning unit 52 may be configured so as to limit, concerning flying body 10 having a time-division duplex function, the assigning of flying body 10 with respect to an airspace specified by specifying unit 51, and so as not to limit, concerning flying body 10 having a communication function other than a time-division duplex function (for example, frequency-division duplex), the assigning of flying body 10 with respect to an airspace specified by specifying unit 51.

Assigning unit 52 of flying body operation management device 50 may store propagation delay information about whether or not a propagation delay equal to or greater than a threshold value occurred in each airspace, condition satisfaction information about whether or not the aforementioned first condition and second condition are satisfied in the airspace, and process information about whether or not the aforementioned suppression process is executed in the airspace, by associating the information with one another, and determine the presence/absence of a suppression process according to the contents of the propagation delay information, condition satisfaction information and process information in each airspace and the frequency thereof. For example, if only propagation delay information indicating that a propagation delay equal to or greater than a threshold value occurred in a given airspace A is stored at a low frequency, the probability of a substantial problem of interference occurring is not high; therefore, satisfaction of the first condition and second condition may also be taken into account and the suppression process may be performed only if the conditions are satisfied. Moreover, if, for example, propagation delay information indicating that a propagation delay equal to or greater than a threshold value occurred in given airspace A and condition satisfaction information indicating that the first condition and second condition are satisfied are stored at a high frequency, it is highly probable that a substantial problem of interference occurs even if satisfaction of the first condition and second condition are not determined each time; therefore, the suppression process may be performed regardless of whether or not the first condition and second condition are satisfied.

The block diagram used to explain the above-described embodiment illustrates functional unit blocks. These functional blocks (components) are realized by arbitrarily combining hardware and/or software. The means for realizing each functional block is not particularly limited. That is, each functional block may be realized by one device that is physically and/or logically bound, or may be realized by a two or more devices, which are physically and/or logically separated, being directly and/or indirectly (for example, via a wire and/or wirelessly) connected.

Each mode/embodiment explained in the present specification may be applied to LTE (long term evolution), LTE-A (LTE-advanced), SUPER 3G, IMT-advanced, 4G, 5G, FRA (future radio access), W-CDMA (registered trademark), GSM (registered trademark), CDMA2000, UMB (ultra mobile broadband), IEEE 802.11 (Wi-Fi), IEEE 802.16 (WiMAX), IEEE 802.20, UWB (ultra-wide band), Bluetooth (registered trademark), other suitable systems and/or next-generation systems expanded on the basis thereof.

The order of the process steps, sequences, flowcharts, and the like, of each mode/embodiment explained in the present specification may be interchanged, provided no specific order exists. For example, the methods explained in the present specification present elements of various steps using the orders thereof as examples, and the orders are not limited to the specific orders presented.

Each mode/embodiment explained in the present specification may be used singularly or in combination, or switched according to the execution thereof. Moreover, notification of predetermined information (for example, notifying "of being X") is not limited to being performed explicitly, and may be performed implicitly (for example, not notifying about the predetermined information).

The terms "system" and "network" are used interchangeably in the present specification.

The information or parameter explained in the present specification may be represented as absolute values or represented as relative values from predetermined values, or may be represented as other corresponding information. For example, a wireless resource may be indicated by an index.

The above-described terms used for the parameters are not limited in any respect. Moreover, mathematical formulae or the like that use the parameters sometimes differ from those explicitly described in the present specification. Various channels (for example, PUCCH, PDCCH, etc.) and information elements (for example, TPC, etc.) can be identified using suitable terms; therefore, the various terms assigned to the various channels and information elements are not limited in any respect.

The term "determining" used in the present specification may include various operations. The term "determining" may include, for example, "determining," judging, calculating, computing, processing, deriving, investigating, looking up (for example, looking up in a table, database or another data structure), and ascertaining. Moreover, the term "determining" may include "determining," receiving (for example, receiving information), transmitting (for example, transmitting information), input, output, and accessing (for example, accessing data in a memory). Furthermore, the term "determining" may include "determining," resolving, selecting, choosing, establishing, comparing, and the like. That is, the term "determining" may include the fact that a certain operation is "determined."

The present invention may be presented as a flight control method or information-processing method comprising a step of processing performed in flight control system 1 and/or flying body operation management device 50. Moreover, the present invention may be presented as a program that is executed in flying body 10 or flying body operation management device 50. This program can be presented by a mode of being recorded in a recording medium such as an optical disk, presented by a mode of being downloaded onto a computer via a network such as the Internet, and installing the program so as to be usable, or the like.

Software, instructions, and the like may be transmitted/received via a transmission medium. If, for example, software is transmitted from a website, a server or another remote source using wired technology such as a coaxial cable, an optical fiber cable, a twisted pair wire, a digital subscriber line (DSL) or the like and/or wireless technology such as infrared rays, wireless and microwaves, the wired technology and/or wireless technology are included in the definition of a transmission medium.

The information, signals and the like explained in the present specification may be represented using various different techniques. For example, data, instructions, commands, information, signals, bits, symbols, chips, and the like, which may be mentioned across the entire explanation above, may be represented by voltage, current, magnetic waves, magnetic fields or magnetic particles, optical fields or protons, or an arbitrary combination thereof.

The terms explained in the present specification and/or terms required to understand the present specification may be replaced with terms having the same or similar meanings. For example, channel and/or symbol may be signal. Moreover, signal may be message. Furthermore, component carrier (CC) may be referred to as carrier frequency, cell, or the like.

The overall element amount or order of various references to elements referred to as "the first", "the second," and the like, in the present specification are not limited thereto. These references may be used in the present specification as methods that are useful for differentiating between two or more elements. Accordingly, references to the first and second elements do not signify that only the two elements may be adopted in that instance, or that the first element must precede the second element in some form.

The term "means" in the configuration of each device described above may be replaced with the terms "unit," "circuit," "device," or the like.

As long as the terms "including," "comprising," and modifications thereof are used within the present specification or claims, the intention of these terms are comprehensive, similar to the term "provided with". Moreover, the intention for the term "or" used in the present specification or claims is not to be an exclusive "or".

In the entirety of the present specification, if, for example, an article (a, an, the) is added, the article is considered to include plurals thereof if the same is not clearly singular from the context.

A wireless frame may comprise one or a plurality of frames in a time region. In a time region, one or a plurality of each frame may be referred to as a subframe. A subframe may further comprise one or a plurality of slots in a time region. A subframe may be a fixed length of time (for example, 1 ms) that is not dependent upon numerical description.

A numerical description may be a communication parameter applied to the transmission and/or reception of a given signal or channel. A numerical description may indicate, for example, one or more of the following: subcarrier spacing (SCS), bandwidth, symbol length, cyclic prefix length, transmission time interval (TTI), the number of symbols per TTI, wireless frame configuration, a specific filtering process performed by a transmitter/receiver in a frequency region, and a specific windowing process performed by a transmitter/receiver in a time region.

A slot may comprise one or a plurality of symbols (orthogonal frequency division multiplexing (OFDM) symbol, single carrier frequency division multiple access (SC-FDMA) symbol, etc.) in a time region. A slot may be a time unit based on a numerical description.

A slot may include a plurality of mini-slots. Each mini-slot may comprise one or a plurality of symbols in a time region. A mini-slot may be referred to as a sub-slot. A mini-slot may comprise a number of symbols that are fewer than the number of slots. A PDSCH (or PUSCH), which is transmitted at a greater time unit than that of the mini-slot, may be referred to as PDSCH (or PUSCH) mapping type A. A PDSCH (or PUSCH) transmitted using a mini-slot may be referred to as PDSCH (or PUSCH) mapping type B.

A wireless frame, a subframe, a slot, a mini-slot, and a symbol each represents a time unit when a signal is transmitted. A wireless frame, a subframe, a slot, a mini-slot, and a symbol may be referred to using another term corresponding to each thereof.

For example, one subframe may be referred to as a transmission time interval (TTI), a plurality of continuous subframes may be referred to as a TTI, and one slot or one mini-slot may be referred to as a TTI. That is, a subframe and/or a TTI may be a subframe (1 ms) in an existing LTE, may be a period shorter than 1 ms (for example, 1-13 symbols), and may be a period longer than 1 ms. A unit representing TTI may be referred to as a slot, a mini-slot, or the like rather than a subframe.

Here, a TTI refers to the shortest time unit in the scheduling of wireless communication, for example. For example, in an LTE system, a base station performs scheduling, which consists of assigning wireless resources (frequency bandwidth, transmission power, etc. capable of being used in each user terminal) to each user terminal using a TTI unit. The definition of TTI is not limited thereto.

A TTI may be a transmission time unit such as a data packet (transport block), a code block, or a code word, which is channel-encrypted, or a processing unit such as scheduling or link adaptation. When a TTI is assigned, the time interval (for example, the number of symbols) in which a transport block, a code block, a code word, etc. is actually mapped may be shorter than the TTI.

When one slot or one mini-slot is referred to as a TTI, one or more TTIs (that is, one or more slots or one or more mini-slots) may serve as the smallest time unit in the scheduling. Moreover, the number of slots (number of mini-slots) that constitute the smallest time unit in the scheduling may be controlled.

A TTI having a time length of 1 ms may be referred to as an ordinary TTI (TTI in LTE Rel. 8-12), a normal TTI, a long TTI, an ordinary subframe, a normal subframe, a long subframe, a slot, or the like. A TTI that is shorter than an ordinary TTI may be referred to as an abbreviated TTI, a short TTI, a partial TTI (or fractional TTI), an abbreviated subframe, a short subframe, a mini-slot, a subslot, a slot, or the like.

A long TTI (for example, an ordinary TTI, a subframe, etc.) may be replaced by a TTI having a time length exceeding 1 ms, and a short TTI (for example, an abbreviated TTI) may be replaced by a TTI having a TTI length shorter than that of the long TTI and equal to or greater than 1 ms.

A resource block (RB) is a resource assignment unit for a time region and a frequency region, and a frequency region may include one or a plurality of continuous sub carriers. The number of subcarriers included in an RB may be the same regardless of a numerical description, and may be 12, for example. The number of subcarriers included in an RB may be determined on the basis of a numerical description.

The time region of an RB may include one or a plurality of symbols, and may be the length of one slot, one mini-slot, one subframe, or one TTI. One TTI, one subframe, or the like may each comprise one or a plurality of resource blocks.

One or a plurality of RBs may be referred to as a physical resource block (PRB, physical RB), a subcarrier group (SCG, sub-carrier group), a resource element group (REG), a PRB pair, an RB pair, or the like.

Moreover, a resource block may comprise one or more resource elements (RE). For example, one RE may be the wireless resource region of one subcarrier and one symbol.

A bandwidth part (BWP) (may be referred to as partial bandwidth or the like) may represent a subset of continuous common resource blocks (common RBs) for a given numerical description in a given carrier. Here, common RBs may be specified by an RB index that uses common reference points of the carrier as a reference. A PRB is defined by a given BWP, and may be numbered within the BWP.

A BWP may include a BWP for UL (UL BWP) and a BWP for DL (DL BWP). One or a plurality of BWPs may be set within one carrier with respect to a UE.

At least one of the BWPs that are set may be active, and it is not necessary to assume that the UE transmits/receives a predetermined signal/channel outside of an active BWP. The "cell," "carrier," and the like in the present disclosure may be replaced by a "BWP."

The structures of the above-described wireless frame, subframe, slot, mini-slot, symbol, and the like, are merely examples. For example, the configuration of the number of subframes included in a wireless frame, the number of slots per subframe or wireless frame, the number of mini-slots included within a slot, the number of symbols and RBs included in a slot or a mini-slot, the number of subcarriers included in an RB, the number of symbols, length of symbol, length of cyclic prefix (CP) within a TTI, and the like may be modified in a variety of ways.

In the present disclosure, terms such as "base station (BS)," "wireless base station," "fixed station," "NodeB," "eNodeB (eNB)," "gNodeB (gNB)," "access point," "transmission point," "reception point," "transmission/reception point," "cell," "sector," "cell group," "carrier," and "component carrier" may be used interchangeably. A base station is sometimes referred to by the terms macro cell, small cell, femtocell, picocell, or the like.

A base station is capable of accommodating one or a plurality (three or more, for example) of cells. If a base station accommodates a plurality of cells, the entire coverage area of the base station can be divided into a plurality of smaller areas, and each of the smaller areas is capable of providing a communication service using a base station subsystem (for example, a remote radio head (RRH)). The terms "cell" or "sector" indicate a portion or the entirety of the coverage area of the base station that performs a communication service in the aforementioned coverage area and/or the base station subsystem.

In the present specification, the terms "mobile station (MS)," "user terminal," "user equipment (UE)," "terminal," and the like, can be used interchangeably.

A mobile station is sometimes referred to by a person skilled in the art using suitable terms such as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, and the like.

A base station and/or a mobile station may be referred to as a transmission device, a reception device, a communication device, or the like. The base station and/or the mobile station may be a device mounted on a moving body or a moving body itself. The moving body may be a vehicle (for example, a car, an airplane, etc.), an unmanned moving body (for example, a drone, a self-driving car, etc.), or a robot (manned or unmanned). The base station and/or the mobile station include a device that does not necessarily move at the time of communication operation. For example, the base station and/or mobile station may be an Internet of Things (IoT) device such as a sensor.

The base station in the present disclosure may be replaced by a user terminal. For example, each mode/embodiment of the present disclosure may be applied to a configuration in which communication between a base station and a user terminal is replaced by communication among a plurality of user terminals (may be referred to as D2D (device-to-device), V2X (vehicle-to everything), etc., for example). In such a case, the configuration of a user terminal may be used as the abovementioned functions of the base station. Moreover, words such as "uplink" and "downlink" may be replaced with words corresponding to communication among terminals. For example, uplink channel, downlink channel, and the like may be replaced with side channel.

Similarly, a user terminal in the present specification may be replaced by a base station. In such a case, the configuration of a base station may be used for the abovementioned functions of the user terminal.

The terms "connected," "coupled," and all variations thereof signify all direct or indirect connection or coupling between two or more elements, and may include the fact that one or more intermediate element is present between two elements that are "connected" or "coupled." Connection or coupling between elements may be physical, logical, or a combination thereof. For example, "connection" may be replaced with "access." When used in the present specification, it can be considered that two elements are "connected" or "coupled" to/with each other by use of one or more wire, cable, and/or print electric connection, and as some non-limiting and non-comprehensive examples, by use of electromagnetic energy or the like, having a wavelength of a wireless frequency region, a micro-wave region, and a light (both visible and invisible) region.

The foregoing is a detailed explanation of the present invention, but it would be obvious to a person skilled in the art that the present invention is not limited to the embodiment explained in the present specification. The present invention may be embodied as corrected and modified modes without deviating from the purpose and scope of the present invention defined by the description in the claims. Accordingly, the description in the present specification aims to explain examples, and does not have a limited significance with respect to the present invention.

EXPLANATION OF THE REFERENCE NUMERALS

1: flight control system;
10: flying body;
20, 30: wireless communication terminals;
40: network;
41: wireless base station;
50: flying body operation management device;
51: specifying unit;
52: assigning unit;
53: flight management unit;
501: control unit;
502: storage unit;
503: communication unit.

The invention claimed is:

1. An aerial vehicle operation management device comprising:
a processor configured to:
identify a first airspace of a plurality of airspaces in which a propagation delay equal to or greater than a first threshold value occurs in an uplink of a time-division duplex between a first wireless communication terminal and a first wireless base station to which the first wireless communication terminal is wirelessly connected;
identify a second airspace of the plurality of airspaces that satisfies a first condition that a second wireless communication terminal performs a time-division duplex with a second wireless base station by use of a guard period that is shorter than a guard period used between the first wireless communication terminal and the first wireless base station;
assign an aerial vehicle to at least one of the identified airspaces according to a flight plan, wherein a restriction is imposed on assignment of the aerial vehicle, on which the first wireless communication terminal is mounted, to at least one of the identified airspaces; and
control the flight of the aerial vehicle through the at least one assigned airspace.

2. The aerial vehicle operation management device according to claim 1, wherein the processor is further configured to identify a third airspace of the plurality of airspaces that satisfies: a second condition that the first wireless communication terminal is present within the third airspace, and the second wireless communication terminal connected to the second wireless base station, which is different from the first wireless base station to which the first wireless communication terminal is connected, is present within a range of a given distance from the first wireless communication terminal.

3. The aerial vehicle operation management device according to claim 2, wherein the given distance is a distance at which the second wireless communication terminal is capable of receiving a wireless signal wave transmitted from the first wireless communication terminal at a reception strength that is equal to or greater than a second threshold value.

4. The aerial vehicle operation management device according to claim 1, wherein the processor is further configured not to assign the aerial vehicle on which the first wireless communication terminal is mounted, to the at least one of the identified airspaces.

5. The aerial vehicle operation management device according to claim 1, wherein the processor is further configured to assign a reduced number of aerial vehicles, on which the first wireless communication terminal is mounted, to the at least one of the identified airspaces, compared to airspaces other than the at least one of the identified airspaces.

6. The aerial vehicle operation management device according to claim 5, wherein the processor is further configured to limit a number of aerial vehicles, on which the first wireless communication terminal is mounted, assigned to the at least one of the identified airspaces, to a number equal to or smaller than a third threshold value that varies depending on the at least one of the identified airspaces.

7. An aerial vehicle operation management method comprising:
  identifying a first airspace of a plurality of airspaces in which a propagation delay equal to or greater than a first threshold value occurs in an uplink of a time-division duplex between a first wireless communication terminal and a first wireless base station to which the first wireless communication terminal is wirelessly connected;
  identifying a second airspace of the plurality of airspaces that satisfies a first condition that a second wireless communication terminal performs a time-division duplex with a second wireless base station by use of a guard period that is shorter than a guard period used between the first wireless communication terminal and the first wireless base station;
  assigning an aerial vehicle to at least one of the identified airspaces according to a flight plan, wherein a restriction is imposed on assignment of the aerial vehicle, on which the first wireless communication terminal is mounted, to at least one of the identified airspaces; and
  controlling the flight of the aerial vehicle through the at least one assigned airspace.

* * * * *